(12) United States Patent
Arroyo et al.

(10) Patent No.: US 9,342,422 B2
(45) Date of Patent: *May 17, 2016

(54) SELECTIVELY COUPLING A PCI HOST BRIDGE TO MULTIPLE PCI COMMUNICATION PATHS

(71) Applicant: International Business Machines Corporation, Armonk, NY (US)

(72) Inventors: Jesse P. Arroyo, Rochester, MN (US); Anjan Kumar Guttahalli Krishna, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/074,009

(22) Filed: Nov. 7, 2013

(65) Prior Publication Data

US 2015/0127971 A1     May 7, 2015

(51) Int. Cl.
| | |
|---|---|
| *G06F 11/00* | (2006.01) |
| *G06F 11/20* | (2006.01) |
| *G06F 11/16* | (2006.01) |
| *G06F 11/07* | (2006.01) |

(Continued)

(52) U.S. Cl.
CPC .......... *G06F 11/2097* (2013.01); *G06F 11/076* (2013.01); *G06F 11/079* (2013.01); *G06F 11/0745* (2013.01); *G06F 11/142* (2013.01); *G06F 11/1616* (2013.01); *G06F 11/1625* (2013.01); *G06F 11/1658* (2013.01); *G06F 11/2005* (2013.01); *G06F 11/2007* (2013.01); *G06F 12/0646* (2013.01); *G06F 13/00* (2013.01)

(58) Field of Classification Search
CPC .......................... G06F 11/079; G06F 12/0646
See application file for complete search history.

(56) References Cited

U.S. PATENT DOCUMENTS

| | | | | |
|---|---|---|---|---|
| 5,872,998 A | * | 2/1999 | Chee | 710/56 |
| 6,112,311 A | * | 8/2000 | Beardsley et al. | 714/3 |

(Continued)

FOREIGN PATENT DOCUMENTS

JP         2009169854 A      7/2009

OTHER PUBLICATIONS

IBM, Self Healing Server I/O Connectivity Design: An IP.com Prior Art Database Technical Disclosure, ip.com, Apr. 29, 2005, <http://ip.com/IPCOM/000124597>.

(Continued)

*Primary Examiner* — Charles Ehne
(74) *Attorney, Agent, or Firm* — Patterson + Sheridan, LLP

(57) ABSTRACT

Instead of disabling PCI communication between system resources in a host computing device and I/O devices when a PCI Host Bridge (PHB) is reset, the host computing device may include a PCI communication path for maintaining communication between the system resources and the I/O devices. In one embodiment, the redundant PCI communication path includes a second PHB that is maintained in a standby state. The host may monitor the errors generated by a plurality of master PHBs and select a master PHB that satisfies an error threshold. The second PHB (i.e., a servant PHB) and the selected master PHB are synchronized, and the second PHB is coupled to the PCI communication path between the master PHB and a PCI switch. The master PHB can then be reset while the second PHB maintains PCI communication between the host and the I/O devices.

13 Claims, 9 Drawing Sheets

(51) Int. Cl.
*G06F 12/06* (2006.01)
*G06F 13/00* (2006.01)
*G06F 11/14* (2006.01)

(56) References Cited

U.S. PATENT DOCUMENTS

| | | | |
|---|---|---|---|
| 6,202,115 B1* | 3/2001 | Khosrowpour | 710/312 |
| 6,708,283 B1 | 3/2004 | Nelvin et al. | |
| 6,732,243 B2 | 5/2004 | Busser et al. | |
| 6,886,107 B2 | 4/2005 | Walsh et al. | |
| 6,920,519 B1* | 7/2005 | Beukema et al. | 710/306 |
| 7,093,043 B2 | 8/2006 | Tan et al. | |
| 7,370,224 B1 | 5/2008 | Jaswa et al. | |
| 7,610,509 B2 | 10/2009 | Abe | |
| 7,925,817 B2 | 4/2011 | Uehara et al. | |
| 2002/0184576 A1* | 12/2002 | Arndt et al. | 714/48 |
| 2003/0065861 A1 | 4/2003 | Clark et al. | |
| 2009/0276605 A1* | 11/2009 | Arndt et al. | 711/209 |
| 2012/0144230 A1 | 6/2012 | Buckland et al. | |

OTHER PUBLICATIONS

IBM, Transparent addressing mechanism in a redundant network: An IP.com Prior Art Database Technical Disclosure, ip.com, Jan. 7, 2003, <http://ip.com/IPCOM/000010657>.

U.S. Appl. No. 13/940,757, entitled "Isolating a PCI Host Bridge in Response to an Error Event," filed by Jesse P. Arroyo et al. on Jul. 12, 2013.

John Gudmundson, "Enabling Multi-Host System Designs with OCI Express Technology," PCI Express, Reprinted from RTC, May 2004.

Akber Kzami, "PCI Express and Non-Transparent Bridging Support High Availability," Reprinted from Embedded Computing Design, Winter 2004.

* cited by examiner

SELECTIVELY COUPLING A PCI HOST BRIDGE TO MULTIPLE PCI COMMUNICATION PATHS

BACKGROUND

The present invention relates to providing redundant data communication paths in a peripheral component interconnect (PCI) link, and more specifically, to activating a standby PCI host bridge when a master PCI host bridge experiences an error.

An unrecoverable or fatal error in a PCI host bridge indicates that the PCI host bridge may be corrupt and cannot recover or continue operation. When such an error is detected, a host computing device may perform a reset as part of an error recovery process on the PCI host bridge. However, while recovering from the error, the PCI host bridge may be taken offline. As a result, the I/O devices (i.e., peripheral devices) that rely on the PCI host bridge to facilitate PCI communication with the host computing device may be communicatively disconnected from the host computing device. In some instances, the PCI host bridge may require tens of seconds to perform the error recovery process until PCI communication between the I/O devices and the host is restored. This downtime may negatively affect a computing system's performance and availability.

SUMMARY

One embodiment of the present disclosure is a method for assigning a servant PCI host bridge (PHB) to one of a plurality of master PHBs. The method, upon determining that one of plurality of master PHBs satisfies an error threshold, assigning the servant PHB to backup the one master PHB, where the servant PHB is selectively coupled to each of the master PHBs using selection logic. Upon assigning the servant PHB to backup the one master PHB, the method includes synchronizing the servant PHB such that settings of the one master PHB are mirrored onto the servant PHB, where the one master PHB is configured to facilitate PCI communication between a host and an I/O device via a PCI switch. The method includes coupling, using the selection logic, the servant PHB to the PCI switch. After coupling the servant PHB to the PCI switch, the method includes resetting the one master PHB, wherein PCI communication between the host and the I/O device flows through the servant PHB while the one master PHB is reset.

Another embodiment of the present disclosure is a computing system. The computing system includes a plurality of master PHBs where each master PHB is coupled to a respective PCI switch via a respective PCI communication path for facilitating PCI communication between the computing system and I/O devices. The computing system also includes a servant PHB selectively coupled to each of the PCI communication paths via selection logic and supervisory logic. The supervisory logic is configured to, upon determining that one of plurality of master PHBs satisfies an error threshold, assign the servant PHB to backup the one master PHB. Upon assigning the servant PHB to backup the one master PHB, the supervisory logic is configured to synchronize the servant PHB such that settings of the one master PHB are mirrored onto the servant PHB. The supervisory logic is configured to couple, using the selection logic, the servant PHB to the respective PCI communication path of the one master PHB and reset the one master PHB, wherein PCI communication between the host and the I/O device flows through the servant PHB while the one master PHB is reset.

Another embodiment of the present disclosure is a computing system. The system includes a plurality of master PHBs, where each master PHB is coupled to a respective PCI switch via a respective PCI communication path for facilitating PCI communication between the computing system and I/O devices. The computing system includes selection logic with an input and an output, where the output comprises respective PCI links to each of the respective PCI communication paths. The computing system also includes a servant PHB coupled to the input of the selection logic, where the selection logic is configured to communicatively couple the servant PHB to a first one of the respective PCI communication paths during a first time period and communicatively couple the servant PHB to a second one of the respective PCI communication paths during a second time period. The servant PBH backups a first one of the plurality of master PHBs during the first time period and backups a second, different one of the plurality of master PHBs during the second time period.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
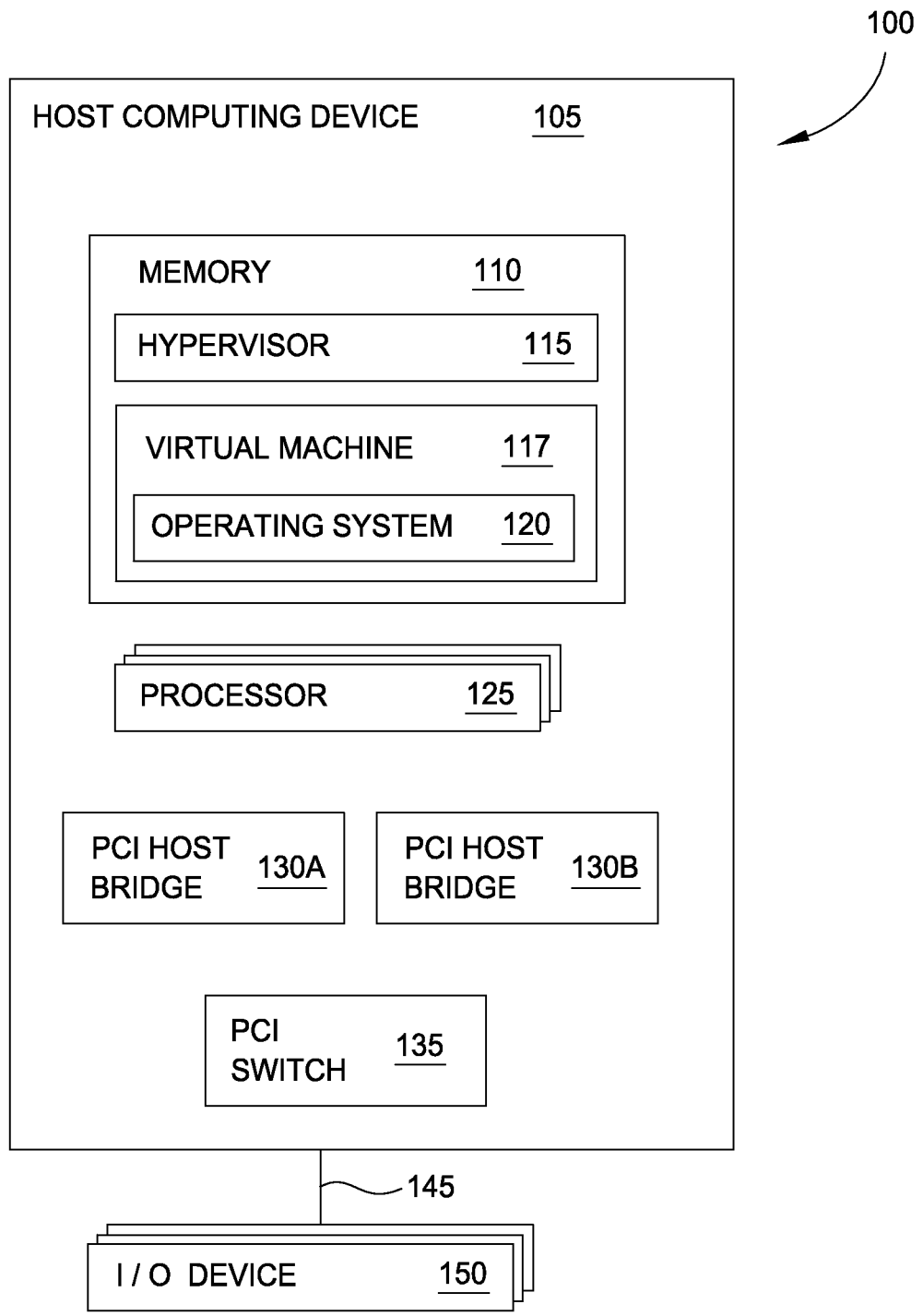
FIG. 1 illustrates a system diagram of a computing device with at least one PCI communication link to an I/O device, according to one embodiment described herein.

A PCI host bridge (PHB) that experiences an error where the PHB cannot recover on its own or continue operation may reset in order to restart operation. To initiate the error recovery process, the PHB may isolate itself from the other system resources operating in the host computing device. Isolating the PHB, however, may prevent transactions sent from the system resources (e.g., Virtual Machines, Operating Systems, etc.) to reach I/O devices coupled to the PHB via a PCI link. That is, the system resources may lose connectivity to the I/O devices. In addition to isolating itself from the other system resources in the host computing device, the PHB may freeze the I/O devices that rely on the PHB to communicate with the system resources within the host computing device. For example, the PHB may cause the I/O devices to switch to a pause or stop state (e.g., a memory mapped input-output (MMIO) stopped state or direct memory access (DMA) stopped state) while the PHB performs the error recovery process. The PHB may inform supervisory logic in the host computing device (e.g., a hypervisor or logic internal to the PHB) that an unrecoverable error has occurred. The hypervisor may then inform the system resources coupled to the PHB and reset the PHB such that the hardware or firmware associated with the PHB is reinitialized. Once the PHB is reinitialized, the supervisory logic informs the system resources that they are now able to reconnect and communicate with the I/O devices.

Performing the technique discussed above may require many seconds to complete. During this time, however, the system resources in the host computing device are unable to communicate with the I/O devices. This downtime can affect system performance, especially in systems that have stringent high-availability requirements. Instead of disabling communication between the system resources in a host computing device and I/O devices, the host computing device may include a redundant PCI communication path for maintaining communication between the system resources and the I/O devices after a first PHB experiences an unrecoverable error. In one embodiment, the redundant PCI communication path includes a second PHB that is maintained in a standby state so long as the first PHB is functioning normally. However, once the first PHB experiences an unrecoverable error, the second PHB is changed to the master state and assumes the responsibility for maintaining communication between the system resources and the I/O devices.

In one embodiment, the first and second PHBs may share a communication link that allows the two PHBs to synchronize. Namely, the routing data contained in the first PHB may constantly, or at intervals, be transferred to the second PHB using the communication link. Accordingly, once the first PHB experiences the unrecoverable error and can no longer facilitate communication between the host device and the I/O devices, the second PHB is already configured with the necessary routing information to assume the responsibility as the master. Once reinitialized, the state of the first PHB may be changed to standby, thereby indicating that the first PHB is ready to reassume the role as master if the second PHB experiences an unrecoverable error.

In one embodiment, the second PHB (e.g., a servant PHB) may serve as a backup or standby PHB for any one of a plurality of master PHBs. For example, the host computing device may include routing logic that couples the second PHB to the PCI communication path associated with any one of the master PHBs. At startup, the second PHB may either be assigned to backup a particular master PHB or the host computing device may wait to assign the second PHB at a later time during operation. For example, the host computing device may monitor the master PHBs to determine if the errors they generate exceed a threshold. Once one of the master PHBs satisfies the threshold, the second PHB may be assigned to backup that PHB. The host computing device may then synchronize the second PHB with the master PHB. Upon synchronizing the PHBs, the host computing device may reset the master PHB and designate the second PHB as the master. Alternatively, the host computing device may wait to initiate the error recovery process until the master PHB encounters an unrecoverable error.

In one embodiment, the second PHB may also be selectively configurable as either a standalone PHB (i.e., a PHB that does not serve as a servant or backup to another PHB) or a servant PHB. When flagged as a standalone PHB, the host computing device may couple the second PHB to its own PCI switch using a separate PCI communication path. When flagged as a servant PHB, however, the host computing device may selectively couple the PHB to one of the PCI communication paths associated with the master PHBs as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a system diagram of a computing device with at least one PCI communication link to an I/O device, according to one embodiment described herein. System 100 includes a host computing device 105 coupled via one or more PCI links 145 to one or more I/O devices 150. As used herein, PCI refers to conventional PCI, PCI Express, or any variant thereof. Moreover, the PCI link 145 may represent a single PCI link that is shared by multiple I/O devices 150 or individual PCI links for each one of the I/O devices 150.

Host computing device 105 includes a memory 110, one or more processors 125, at least two PHBs 130A-B, and a PCI switch 135. Memory 110 may include volatile memory element, non-volatile memory elements, or a combination of both. For example, memory 110 may include both RAM and a hard disk drive which are used in combination to store data associated with host computing device 105. Here, memory 110 stores a hypervisor 115 and at least one virtual machine 117 executing on the host computing device 105. For example, host computing device 105 may be a server whose hardware is used to host a plurality of virtual machines 117. In one embodiment, the host computing device 105 uses the hypervisor 115 to manage and configure the various virtual machines 117. Although the hypervisor 115 is shown as software, in other embodiments, hypervisor 115 may be implemented using firmware or hardware.

In one embodiment, virtual machine 117 is a software implemented abstraction of the underlying hardware in the host computing device 105. As such, each virtual machine 117 may provide a complete system platform which supports the execution of an operating system 120. However, the advantages and details of using and implementing virtual machines 117 will not be discussed in detail here.

The various system resources in the host computing device 105—e.g., virtual machine 117, operating system 120, processor 125, and the like—may communicate with the I/O devices 150 using the PCI link 145. For example, virtual machines 117 may use the I/O devices 150 to expand their capabilities such as providing additional storage (e.g., memory cards or disk drives), specialized processing (e.g., video cards), specialized function (e.g., wireless cards), and the like. Further still, in one embodiment, the I/O devices 150 may be owned or assigned to a particular system resource. For example, each virtual machine 117 may be assigned a specific I/O device 150, or the memory space in an I/O device 150 may be separated into a plurality of partitions where each partition is assigned to a specific virtual machine 117. Although virtual machines 117 and processors 125 are examples of system resources in host computing device 105 that may communicate with the I/O devices 150, the embodiments described herein are not limited to such.

To facilitate communication between the system resources and the I/O devices 150, host computing device 105 includes PHBs 130A-B and a PCI switch 135. Generally, the PHBs 130A-B may provide an interface between PCI communication and a communication method used to transfer data within host computing device 105. For example, host computing device 105 may transfer data internally using a system bus and a parallel data communication method while some embodiments of PCI use serial communication to transmit data to the I/O devices 150. The PHBs 130 may serve as an intermediary between these two communication techniques. Moreover, PHBs 130 may perform memory translations between the memory space in the I/O devices 150 and memory 110 of the host computing device 105. As such, each PHB 130 may include a first interface that couples to a bus of the host computing device 105 (e.g., an ASIC interconnect bus) and a second interface that couples to the PCI switch 135. Although only two PHBs 130 are shown in system 100, in other embodiments it may be desirable to have more than two PHBs 130 for additional redundancy.

In one embodiment, the PHBs 130 are hardware units (e.g., ASICs) mounted in the host computing device 105. Although not shown, the PHBs 130 may include firmware or software that controls and monitors the functions of the PHBs 130. Specifically, the firmware or software associated with the PHBs 130 may include routing information and/or memory translation information that permits the PHBs 130 to route requests from system resources in the host computing device 105 to the appropriate I/O device 150, and vice versa. Specifically, the PHBs 130 may use PCI switch 135 to communicate with I/O devices 150. As such, the PCI switch 135 may also contain routing information for determining which I/O device 150 is the appropriate destination. Like the PHBs 130, the PCI switch 135 may also be a hardware element which may be controlled using associated firmware or software.

In one embodiment, PHBs 130 in system 100 may be used to establish a redundant communication path. Specifically, PHBs 130 may be configured in a master-servant relationship where one of the PHBs 130 is the master (i.e., is currently facilitating data traffic between the I/O devices 150 and the system resources in the host computing device 105) while the other PHB 130 is the servant (i.e., is on standby). However, as will be discussed in greater detail below, if the master PHB 130 experiences an error which forces it to be taken offline, the servant PHB 130 may be promoted to the master PHB 130 thereby maintaining the data flow between the system resources and the I/O devices 150. The embodiments described herein may be used to shorten downtime and minimize data loss compared to a system 100 where only one PHB 130 is used.

Figure 2:
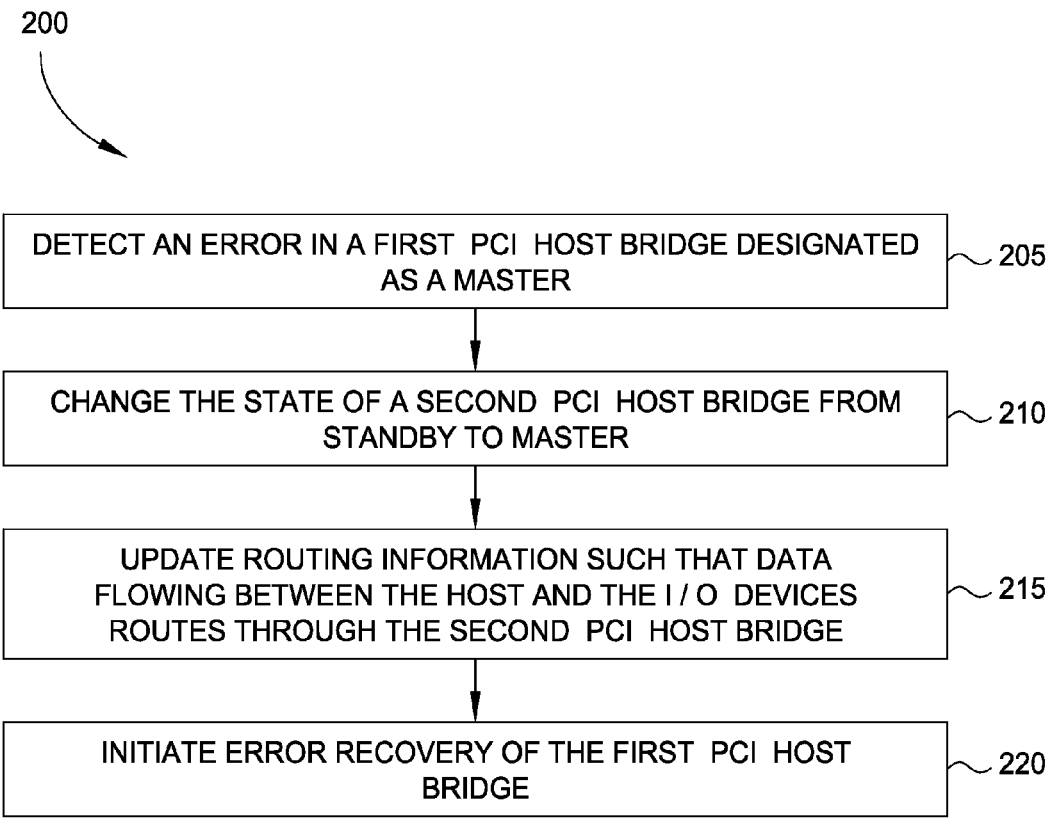
FIG. 2 is a flow chart for maintaining PCI communication when detecting an unrecoverable error in a PHB, according to one embodiment described herein.

FIG. 2 is a flow chart for maintaining PCI communication when detecting an unrecoverable error in a PHB, according to one embodiment described herein. Method 200 begins at block 205 when a first PHB experiences an error from which it cannot recover. For example, the first PHB may use error correction codes to determine that the data flowing through the PHB is becoming corrupted or that an internal memory array used to perform memory translation stores corrupt data. Another example of an unrecoverable error is when the data links between the PHB and the PCI switch are physically disconnected (e.g., severed). Generally, an unrecoverable error may be any error where the PHB is unable to continue to operate. The unrecoverable error may be detected by the PHB itself—e.g., an error monitoring module in the PHB's firmware—or by the hypervisor.

Upon detecting the unrecoverable error, the first PHB may be demoted from its master state. Referring to FIG. 1, the PHB 130 designated as master may be responsible for establishing a PCI communication link between the system resources of the host computing device 105 and the I/O devices 150. The other PHB 130, in contrast, may be designated as the servant PHB and is unused.

In addition to demoting the first PHB, at block 210 the hypervisor may promote the second PHB to the master. Specifically, the hypervisor may change state bits associated with the second PHB from a standby state to a master state. In response, the second PHB begins to facilitate data traffic between the host computing device and the I/O devices. Alternatively, instead of the hypervisor promoting the second PHB to the role of master, the first PHB may transmit a signal or interrupt directly to the second PHB instructing the second PHB to change its state to master.

In one embodiment, the hypervisor may perform fault isolation on the first PHB such that first PHB can no longer communicate with the system resources in the host computing device. Doing so prevents subsequent transactions from being sent or received on, for example, the ASIC interconnect bus communicatively coupling the first PHB to the system resources. In one embodiment, the first PHB may change its state from master to standby once the first PHB receives an acknowledgement signal back from the second PHB.

At block 215, the hypervisor may update routing information such that data flowing between the host computing device and the I/O devices routes through the second PHB. For example, the hypervisor may instruct the system resources in the host computing device to begin transmitting data messages intended for the I/O devices to the second PHB rather than the first PHB. In addition, the hypervisor may update the PCI switch to renumber the upstream buses and routing so that data traveling from the I/O devices is routed to the second PHB. Because the PCI switch knows the correct PHB, the hypervisor may be able to avoid reconfiguring the I/O devices directly.

As will be discussed in greater detail below, the first and second PHBs may be synchronized so that the standby PHB is able to assume the role as master as soon as the current master PHB experiences an unrecoverable error. In one embodiment, the host computing device may ensure that the first and second PHBs are configured in the similar manner—e.g., contain the same routing information—such that when one fails, the other has the necessary information for continuing to facilitate PCI communication between the host and the I/O devices. To the perspectives of the I/O devices and the system resources in the host computing device, they may not know that they are using a different PHB when one of PHBs fail and the other takes over. By keeping the first and second PHBs synchronized, switching from using the first PHB to using the second PHB may be substantially seamless. Once the PCI switch and the system resources are configured to communicate with the second PHB instead of the first PHB, the system may begin to use the second PHB to pass data between the I/O devices and the system resources.

At block 220, the first PHB begins the recovery process. In one embodiment, the recovery process involves resetting the hardware or firmware (or both) of the first PHB. The system may further isolate the first PHB by electrically disconnecting the first PHB from the downstream PCI switch and I/O devices. In some recovery techniques, resetting the PHB also resets the PCI switch and may even reset the I/O devices coupled to the switch. Because method 200 may maintain communication between the I/O devices and the system resources while the first PHB is resetting, it may be undesirable to permit resetting the first PHB to affect the I/O devices or PCI switch. Accordingly, disconnecting the first PHB from these devices ensures that resetting the first PHB does not disrupt the ability of the PCI switch and I/O device to use the redundant PCI link provided by the second PHB.

Resetting the first PHB may take several seconds to complete. During this time, the second PHB may continue to permit the host computing device and the I/O devices to exchange data. Once the reset is complete and the first PHB has recovered from the error, the hypervisor may restore the electrical connection between the first PHB and the PCI switch. Moreover, the hypervisor may continue to synchronize the first and second PHBs. Thus, if the second PHB experiences an unrecoverable error, the first PHB may be again promoted to master while the second PHB performs the recovery process.

In other embodiments, method 200 may be performed even if the PHB does not experience an unrecoverable error. For example, a user may wish to reset PHB to perform a software or firmware update. In another scenario, a system may have multiple processors that each couple to a respective PHB. When one of the processors is replaced, the hypervisor may use method 200 so that data destined to the removed processor is instead forwarded to the other PHB, and thus, to the processor remaining in the system. Generally, method 200 may be used if the user does not want to lose connectivity between the host computing device and the I/O devices when there are redundant PHBs.

Figure 3:
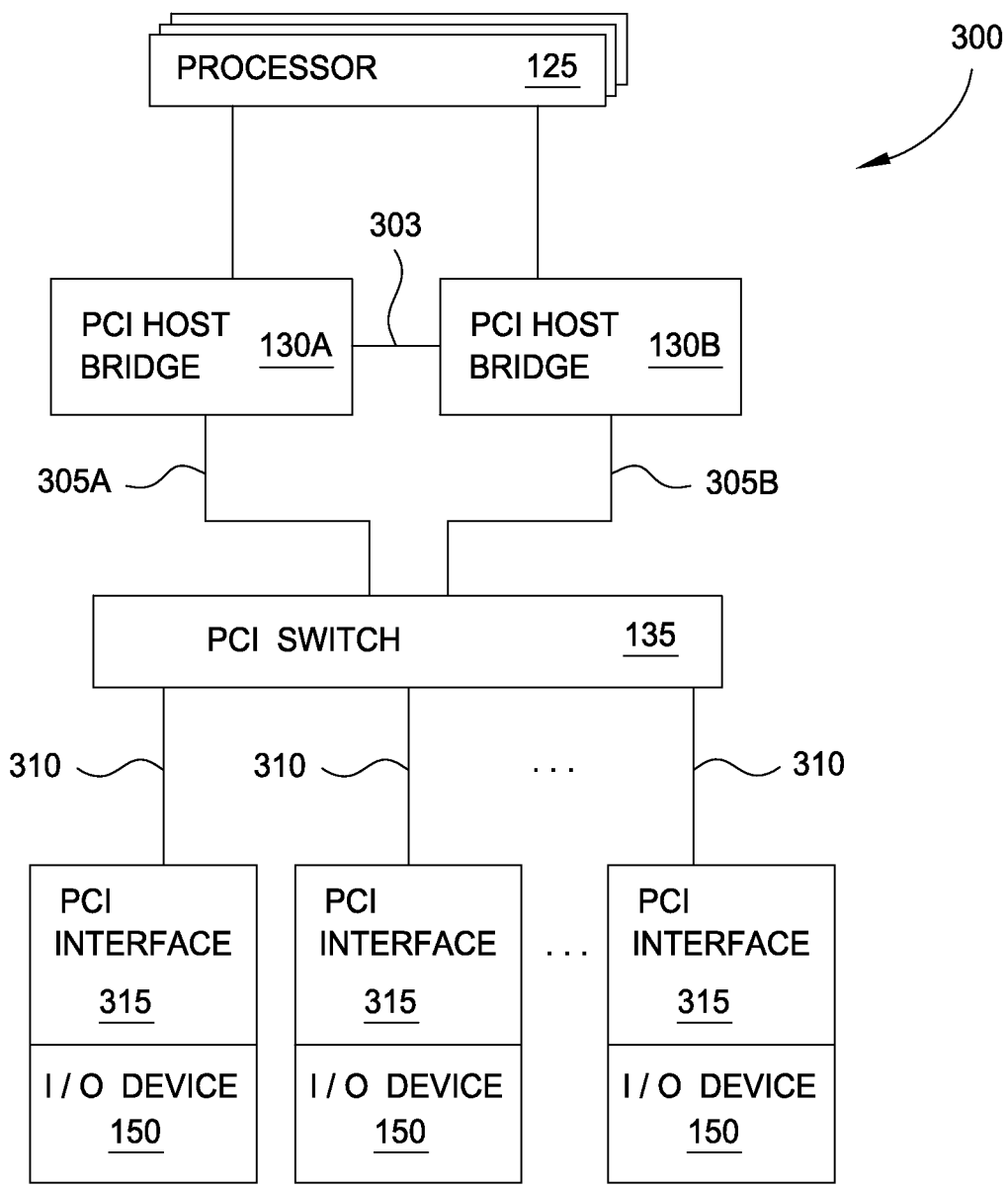
FIG. 3 illustrates a system diagram of a computing device with redundant PCI communication paths, according to one embodiment described herein.

FIG. 3 illustrates a system diagram of a computing device with redundant PCI communication paths, according to one embodiment described herein. System 300 includes one or more processors 125 coupled to the PHBs 130. Although shown as separate links, the PHBs 130 may be coupled to a shared internal bus which enables the PHB to receive and transfer data to the different system resources executing on the host computing device. The PHBs 130 may also be communicatively coupled using a direct link 303. This link 303 may enable the two PHBs 130 to maintain synchronization. For example, if the first PHB 130A updates an I/O page table (or I/O Translation Table), the PHB 130A may push out the update to the second PHB 130B. Thus, if the first PHB 130A fails and must be reset, the second PHB 130B is already configured with the same information as that found on PHB 130A. Moreover, the direct link 303 may also be used by the current master PHB to directly inform the standby PHB that it has failed and that the standby PHB should assume the role of master. The direct link 303 is not limited to any particular communication technique or protocol. For example, link 303 may use either serial or parallel communication to transfer data between PHB 130A and 130B. In one embodiment, the PHBs 130 may be separate ICs, or separate areas of a shared IC, that are integrated into a device package. Here, the direct link 303 may be a link in the package coupling the PHBs 130 together.

In other embodiments, instead of having a direct physical link 303, system 300 may synchronize the PHBs using the communication path between processor 125 and PHBs 130. For example, when the page table in PHB 130A is updated, the hypervisor (not shown) may push out the update using processor 125 to PHB 130B. That is, PHB 130A may inform the hypervisor that a configuration value has changed and, in turn, the hypervisor may relay the change to PHB 130B.

In system 300, both PHB 130A and PHB 130B have respective PCI links 305A-B to PCI switch 135. If PCI Express is the communication protocol used by system 300 the links 305 may include any number of PCI lanes (e.g., ×1, ×4, ×16, ×32, etc.). In one embodiment, system 300 may activate only the PCI link 305 that is associated with the PHB 130 that is currently designated as the master while the other PCI link 305 remains unused. In another embodiment, system 300 may include logic elements that permit the PHBs 130 to share the same PCI link rather than using separate physical links 305 as shown.

PCI switch 135 is coupled to both PHB 130A and PHB 130B via the PCI links 305. In one embodiment, the PCI switch 135 may be used to create multiple endpoints out of one physical endpoint (e.g., 110 device 150) to allow the association of one endpoint with multiple system resources (e.g., virtual machines or operating systems) executing within a host. PCI switch 135 receives instructions from the master PHB 130 and, using routing information, forwards the instructions to the correct I/O device 150. As discussed above, the hypervisor may configure PCI switch 135 to know which PHB 130 to use when transferring data from the I/O devices 150 to the processor 125. Thus, during a PHB failure, the PCI switch 135 can be reconfigured to forward traffic to the new master PHB.

System 300 includes a plurality of PCI interfaces 315—e.g., PCI slots—that provide a receptacle for the I/O devices 150. For example, the PCI interfaces 315 may be within a chassis of a host computing device or exposed at an outer surface of the chassis. Using interfaces 315, a system administrator may connect I/O devices to the host computing device.

Figure 4:
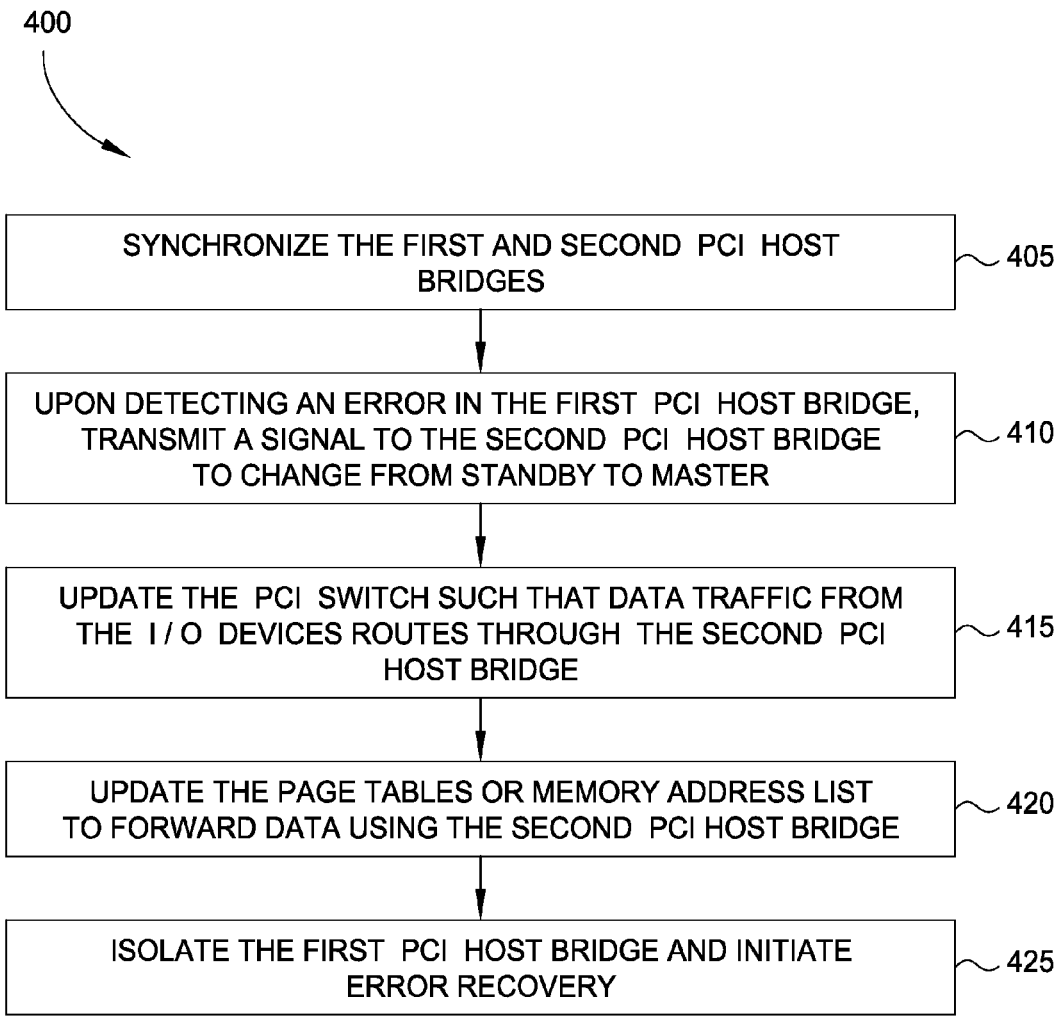
FIG. 4 is a flow chart for using redundant PCI communication paths when detecting an unrecoverable error in a PHB, according to one embodiment described herein.

FIG. 4 is a flow chart for using redundant PCI communication paths when detecting an unrecoverable error in a PHB, according to one embodiment described herein. Method 400 begins at block 405 where the first and second PHB are synchronized. This synchronization may occur before or after the first PHB (i.e., the master PHB) experiences an unrecoverable error. Moreover, the first and second PHBs may be synchronized directly (using a direct link) or indirectly (using the hypervisor). Generally, each change made to the settings or routing information in the master PHB may be mirrored to the servant PHB. In this manner, the first and second PHBs may be programmed identically. It may be advantageous for this synchronization process to happen continually or constantly (e.g., at predefined intervals or every time a setting is changed) so that the servant PHB is always ready to assume the role as master. Alternatively, it may be advantageous to delay synchronizing the first and second PHBs until the master experiences an unrecoverable error since this delays having to send synchronization data until the master PHB fails.

Upon detecting an error, the first PHB or the hypervisor may transmit a signal to the second PHB instructing the second PHB to assume the role of master. Specifically, the signal may instruct the second PHB to change its state bits from a standby state to a master state. In response, the second PHB begins to facilitate data traffic between the host computing device and the I/O devices. In one embodiment, when experiencing an unrecoverable error, the first PHB uses the direct link 303 shown in FIG. 3 to transmit the signal to the second PHB. In addition, the hypervisor may perform fault isolation on the first PHB such that first PHB can no longer communicate with the system resources in the host computing device. Doing so prevents subsequent transactions from being sent or received on, for example, the bus which enables the first PHB to communicate with the system resources in the host computing device. In one embodiment, the first PHB may change its state from master to standby once the first PHB receives an acknowledgement signal back from the second PHB via, for example, the direct link.

At block 415, the hypervisor may update routing information on the PCI switch such that data flowing from the I/O devices to the system resources of the host computing device routes through the second PHB. For example, the hypervisor may update the PCI switch to renumber the upstream buses and routing so that data traveling from the I/O devices flows to the second PHB. Because the PCI switch knows the correct PHB, the hypervisor may be able to avoid reconfiguring the I/O devices directly.

At block 420, the hypervisor may update the page tables or a memory address list to forward data using the second PHB. If the I/O page tables (which may be stored in system memory, e.g., memory 110 of FIG. 1) are changed, the hypervisor may reroute the physical address maps such that the maps point to the second PHB rather than the first PHB. Alternatively, the hypervisor may update the memory address list stored on the second PHB to reflect that the second PHB now is responsible for the same memory addresses as that of the first PHB. Thus, in this example, method 400 may not mirror the exact same settings from the first PHB to the second PHB. Instead, the memory address lists may be maintained separately until the first PHB fails. In response, the hypervisor may complete the synchronization process by storing the memory address list of the first PHB into the second PHB. By changing the memory address lists, the page tables can remain unchanged. Once the upstream and downstream devices have been configured to route data through the second PHB, the second PHB can be used to maintain the flow of data between the I/O devices and the host computing device.

Although the handoff of the responsibilities between the master PHB and the servant PHB may occur almost instantly, there still may be some data loss. For example, data that is currently being handled by the master PHB when an unrecoverable error occurs may be dropped. In one embodiment, the PCI switch may have a replay function that permits the switch to replay transient data (i.e., data that is currently flowing between the I/O devices and the first and second PHBs). The replay feature of the PCI switch may be useful where in-flight or pending data (i.e., data that has not yet reached its ultimate destination) is lost or dropped when the first PHB experiences an unrecoverable error. Specifically, the PCI switch may be processing in-flight data intended for the first PHB when the first PHB experiences the error. Before the second PHB assumes the role of master, some of the in-flight data may be dropped. The hypervisor or the second PHB may initiate the replay feature of the PCI switch so that the in-flight or pending is retransmitted to the second PHB which is then able to forward the data to the correct system resource.

At block 425, the first PHB begins the recovery process. In one embodiment, the recovery process involves resetting the hardware or firmware (or both) of the first PHB. The system may further isolate the first PHB by electrically disconnecting the first PHB from the downstream PCI switch and I/O devices. In some recovery techniques, resetting the PHB also resets the PCI switch and may even reset the I/O devices coupled to the switch. Because method 400 may maintain communication between the I/O devices and the system resources while the first PHB is resetting, it may be undesirable to permit resetting the first PHB to affect the I/O devices or PCI switch. Accordingly, disconnecting the first PHB from these devices ensures that resetting the first PHB does no disrupt the ability of the PCI switch and the I/O device to use the redundant PCI link provided by the second PHB.

Resetting the first PHB may take several seconds to complete. During this time, the second PHB may continue to permit the host computing device and the I/O devices to exchange data. Once the reset is complete and the first PHB has recovered from the error, the hypervisor may restore the electrical connection between the first PHB and the PCI switch. Moreover, the hypervisor may continue to synchronize the first and second PHBs. Thus, if the second PHB experiences a unrecoverable error, the first PHB may be again promoted to master while the second PHB performs the recovery process.

In other embodiments, method 400 may be performed even if the PHB does not experience an unrecoverable error. For example, a user may wish to reset PHB to perform a software or firmware update. If the user does not want to lose connectivity between the host computing device and the I/O devices when the PHB is reset during the update, method 400 may be used.

Selectively Coupling a Servant PHB to Multiple Master PHBs

Figure 5:
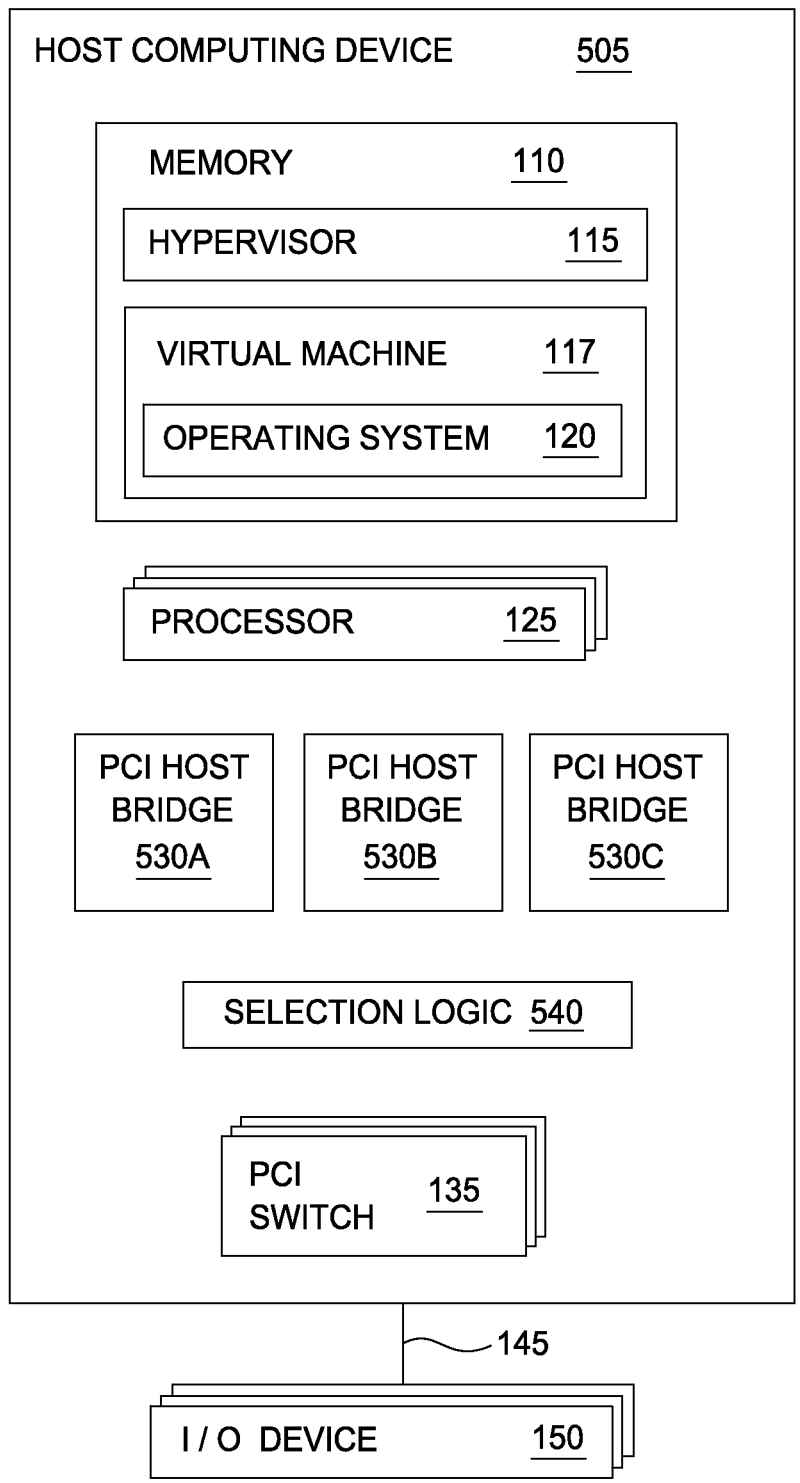
FIG. 5 illustrates a system diagram of a computing device with a servant PHB, according to one embodiment described herein.

FIG. 5 illustrates a system diagram of a host computing device 505 with a redundant PHB, according to one embodiment described herein. Host computing device 505 includes many of the same computing components shown in FIG. 1 which will not be discussed in detail here. To facilitate communication between the system resources and the I/O devices 150, host computing device 505 includes PHBs 530A-C and PCI switches 135. Like the PHBs described in FIG. 1, the PHBs 530 may provide an interface between PCI communication used to transfer data to the I/O devices 150 and a communication method used to transfer data within host computing device 505. For example, host computing device 505 may transfer data internally using a system bus and a parallel data communication method while using a PCI communication technique to transmit data to the I/O devices 150. The PHBs 530 may serve as an intermediary between these two communication techniques. Moreover, PHBs 530 may perform memory translations between the memory space in the I/O devices 150 and memory 110 of the host computing device 505. Each PHB 530 may include a first interface that couples to a bus of the host computing device 105 (e.g., an ASIC interconnect bus) and a second interface that couples to one of the PCI switches 135.

In one embodiment, the PHBs 530 are hardware units (e.g., ASICs) mounted in the host computing device 505. Although not shown, the PHBs 530 may include firmware or software that controls and monitors the functions of the PHBs 530. Specifically, the firmware or software associated with the PHBs 530 may include routing information and/or memory translation information that permits the PHBs 530 to route requests from system resources in the host computing device 505 to the appropriate I/O device 150, and vice versa. Specifically, the PHBs 530 may use a respective PCI switch 135 to communicate with I/O devices 150. As such, the PCI switches 135 may also contain routing information for determining which I/O device 150 is the appropriate destination. Like the PHBs 530, the PCI switches 135 may also be a hardware element which may be controlled using associated firmware or software.

The PHBs 530 may also include storage elements such as registers that designate the PHB as being a servant PHB. For example, the storage element may have a flag that, when set, indicates that the PHB is a servant PHB that is used to backup a master PHB. If the flag is not set, the PHB may be designated as standalone PHB—e.g., the PHB may be a master PHB—rather than a servant PHB. In one embodiment, one PHB may serve as a servant PHB for a plurality of master PHBs at the time of initial system configuration, such that, the servant PHB can act as a standby PHB for any one of the plurality of master PHBs. To do so, host computing device 505 includes selection logic 540 that permits the hypervisor 115 to connect the servant PHB to a PCI communication path between a master PHB and its respective PCI switch 135. In one embodiment, the selection logic 540 may be a hardware or firmware switch (e.g., a multiplexer) that allows the servant PHB to connect to any one of the master PHBs. As will be described in more detail above, when the hypervisor 115 identifies a master PHB that should be reset, the hypervisor 115 may synchronize the identified master PHB with the servant PHB and use the selection logic 540 to couple to the servant PHB to the PCI communication path used by the master PHB to reach its respective PCI switch 135. The hypervisor 115 may then reset the master PHB while the servant PHB is used to maintain communication between the host device 505 and the I/O devices 150.

In one embodiment, the host device 505 may dynamically change which PCI communication path the servant PHB is coupled to during operation. Assuming PHB 530B is the servant while PHBs 530A and 530C are masters, at time A, PHB 530B may backup PHB 530A. However, after PHB 530A has went through the error recovery process discussed above and is again designated as a master PHB, at time B, the host computing device 505 may use the selection logic 540 so that PHB 530B now assigned to backup PHB 530C. Doing so enables the host computing device 505 to then reset PHB 530C while PHB 530B maintains connectivity between the host device 505 and the I/O device 150 that were using PHB 530C to communicate with the processor 125. In this manner, a single servant PHB may be used dynamically to backup a plurality of master PHBs at different times.

Figure 6:
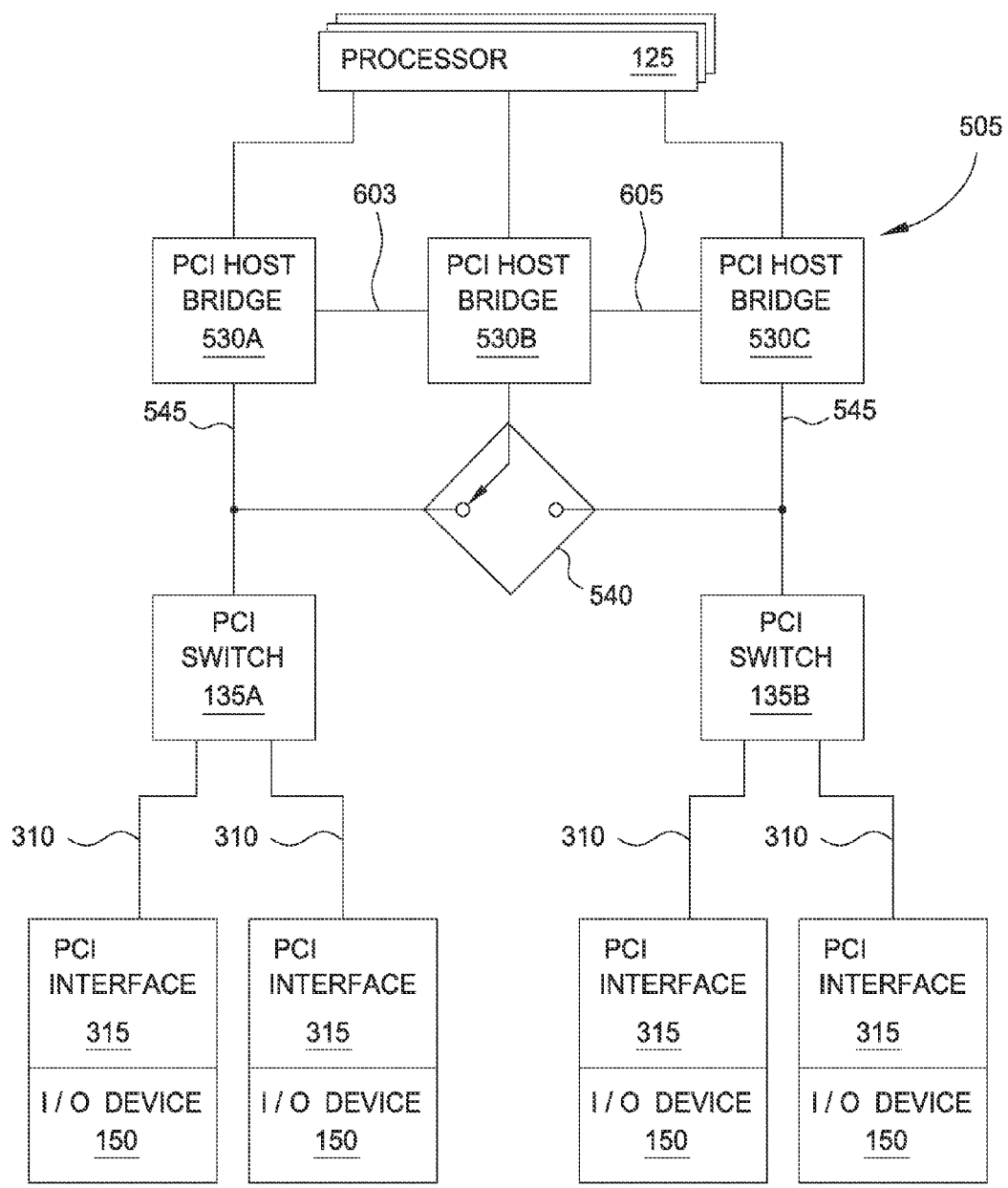
FIG. 6 illustrates a system diagram of a computing device with a servant PHB that is selectively coupled to multiple PCI switches, according to one embodiment described herein.

FIG. 6 illustrates a system diagram of a computing device 505 with a servant PHB 530B that is selectively coupled to multiple PCI switches 135, according to one embodiment described herein. Here, the servant PHB 530B is selectively coupled to either master PHB 530A or to master PHB 530C using the selection logic 540 which may be any switching element (e.g., transistor, mux, etc.) capable of performing the functions described herein. The hypervisor may either connect the servant PHB 530B to one of the PCI communication paths 545 at startup or during operation.

The master PHBs 530A, C are communicatively coupled to the servant PHB 530B using respective links 603 and 605. These links 603, 605 may enable the servant PHB 530B to synchronize to one of the master PHBs 530A, C and to maintain that synchronization. For example, if the hypervisor has currently assigned PHB 530B as a servant to PHB 530A and PHB 530A updates an I/O page table (or I/O Translation Table), the PHB 530A may push out the update to the servant PHB 530B. Thus, if the master PHB 530A fails and must be reset, the servant PHB 530B is already configured with the same information as that found on PHB 530A. Moreover, the direct links 603 and 605 may also be used by a master PHB 530A,C to directly inform the servant PHB 530B that it has failed and that the servant PHB 530B should assume the role of master. The direct links 603, 605 are not limited to any particular communication technique or protocol. For example, links 603 and 605 may use either serial or parallel communication to transfer data between the PHBs 530. In one embodiment, the PHBs 530 may be separate ICs, or separate areas of a shared IC, that are integrated into a device package. Here, the direct links 603, 605 may be respective links in the package coupling the master PHBs 530A and 530C to the servant PHB 530B.

Although three PHBs 530 are shown in FIGS. 5 and 6, the host computing device may include any number of PHBs. For example, the servant PHB may be used to selectively backup any number of master PHBs—e.g., more than just the two shown. Additionally, in one embodiment, a master PHB may be selectively coupled to multiple servant PHBs. For example, a host device may include ten master PHBs that are each selectively coupled to two servant PHBs. Doing so may increase the number of wires in the PCI communication path but may reduce the likelihood of a communication failure relative to a host device that also includes ten master PHBs where five master PHBs are selectively coupled to a first servant PHB and the other five master PHBs are selectively coupled to a second servant PHB. If two of the five master PHBs coupled to the same servant PHB need to be reset at the same time, the host device may experience a communication failure since there is only one available servant PHB per group of five master PHBs. In contrast, if the ten master PHBs were selectively coupled to both servant PHBs, then so long as only two master PHBs needed to be reset at any given time, the hypervisor could use either of the two servant PHBs. Stated differently, providing selection logic such that a plurality of servant PHBs may be selected to back up a single master PHB may increase the availability of the system and reduce communication failures based on unrecoverable errors.

Figure 7:
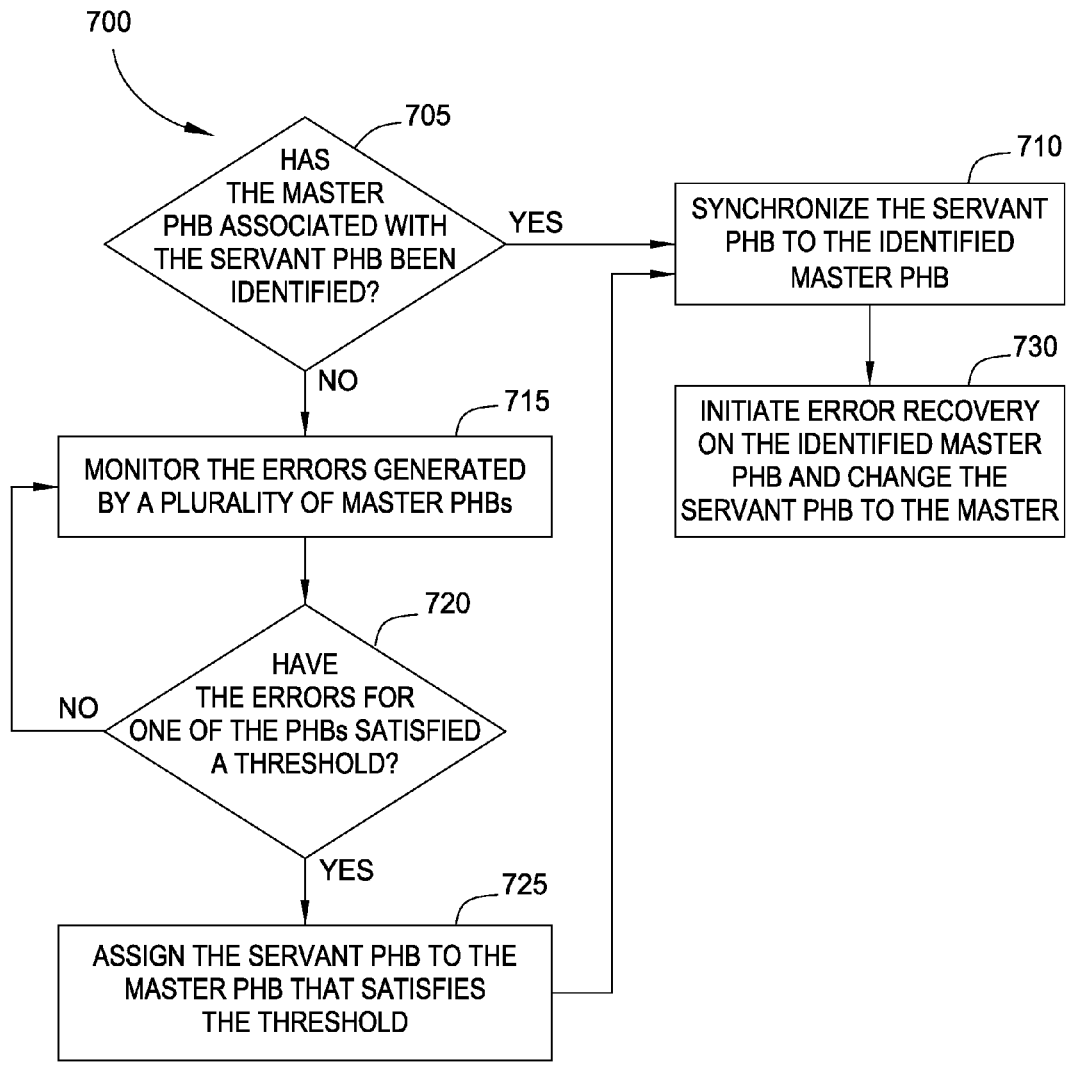
FIG. 7 is a flow chart for using a servant PHB with multiple master PHBs, according to one embodiment described herein.

FIG. 7 is a flow chart for using a servant PHB with multiple master PHBs, according to one embodiment described herein. The method 700 may be performed by the host device (e.g., the hypervisor) at startup or dynamically during operation (or both). At block 705, the hypervisor determines whether the servant PHB is associated with a particular master PHB. Because the hypervisor may be able to selectively couple the servant PHB to a plurality of master PHBs, the hypervisor may check a register on the servant PHB to see if the register contains information identifying one of the master PHBs. If so, at block 710, the hypervisor may synchronize the servant PHB to the master PHB identified by the register as discussed at block 405 of FIG. 4. This synchronization may occur using the direct links 603, 605 shown in FIG. 6 or via a processor 125 that is coupled to both the master and servant PHBs.

If the register does not yet identify a particular master PHB, at block 715, the hypervisor may monitor the errors generated by the plurality of master PHBs. In one embodiment, during operation, the master PHBs may issue correctable errors (i.e., recoverable errors) that do not prevent the master PHBs from continuing to operate. Although correctable errors may not cause a PCI communication failure, these errors may nonetheless indicate or predict that the master PHB may likely experience an unrecoverable error in the future. Accordingly, by monitoring the correctable errors, a hypervisor may determine what master PHB is likely to experience an unrecoverable error and should be assigned to the servant PHB. One example of a correctable or predictable error includes repeated single bit errors on a double-bit (ECC) protected array internal to the PHB logic. These errors are automatically corrected by the hardware, but a large frequency of these errors can indicate a possible future failure of the PHB. Another example of correctable errors are repeated errors detected on the PCI express bus by the PHB that may be either a sign of marginal PHB chip fabrication or bad signal from the device on the bus.

At block 720, the hypervisor may compare the number of errors generated by each master PHB to a threshold which may represent the likelihood that a master PHB will experience an unrecoverable error in the near future. In one embodiment, the threshold may be a frequency of errors—i.e., the number of errors generated during a predefined time period. The hypervisor may maintain a count for each master PHB during the predefined time period and compare the resulting frequency value (i.e., the count divided by the time period) to the frequency threshold. However, the threshold is not limited to a frequency but can be any type of threshold (or a plurality of thresholds). For example, the hypervisor may characterize the correctable errors into different types and weight the types differently—i.e., some correctable errors may provide stronger indications that an unrecoverable error is about to occur than others. Alternatively, the hypervisor may compare the number of errors generated by each of the master PHBs to a maximum error threshold.

In one embodiment, the error threshold may be whether a master PHB has already experienced an unrecoverable error. That is, instead of using correctable errors to predict whether a master PHB will soon experience an unrecoverable, the hypervisor may wait until a master PHB actually experiences an unrecoverable error that prevents the PHB from continuing facilitate PCI communication. Although a PHB experiences an unrecoverable error, it may still be able to synchronize with the servant PHB so that the servant PHB can take over the role as master at least while the PHB performs the error recovery process.

If none of the master PHBs satisfy the threshold, method 700 returns to block 715 to continue to monitor the errors generated by the master PHBs. However, if the threshold is satisfied, at block 725, the hypervisor assigns the servant or standby PHB to the master PHB that satisfies the threshold. For example, the hypervisor may use the selection logic 540 as shown in FIG. 6 to couple the servant PHB to the PCI communication path between the identified master PHB 530A or 530C and its PCI switch 135. However, the servant PHB may not use the PCI communication path to transmit data to the PCI switch until the master PHB initiates the error recovery process—e.g., until the servant PHB is designated as the master. Thus, even though the servant PHB is coupled to the PCI switch, it may wait to transmit data to the switch until instructed to do so by the master PHB or some other element in the host computing device such as the hypervisor or processor. In another embodiment, the hypervisor may wait to communicatively couple the servant PHB to the PCI switch until the master PHB begins the error recovery process.

At block 710, the servant PHB is synchronized to the assigned master PHB. To do so, the hypervisor may update a register in the servant PHB that points to the assigned master PHB. This may result in the servant PHB sending request to the master PHB for the relevant synchronization data—e.g., I/O tables, address information, routing information, and the like. Generally, each change made to the settings or routing information in the master PHB may be mirrored to the servant PHB. In this manner, the PHBs may be programmed identically as described above.

At block 730, the master PHB begins the error recovery process during which time the servant PHB is designated as the master. In one embodiment, the master PHB may begin the error recovery process in response to encountering an unrecoverable error. That is, a standby PHB can continue to provide redundancy to the Master PHB until there is an unexpected fatal error. For example, based on the frequency of correctable errors, the hypervisor may assign the servant PHB to the master PHB and maintain synchronization between the PHBs. However, the hypervisor may wait until the master PHB actually encounters an unrecoverable error and cannot continue to operate (or some other threshold) before the master PHB begins the error recovery process and the servant PHB takes over as the master. Moreover, because the unrecoverable error may be used as the threshold in block 715 to determine which master PHB the servant PHB should be assigned to, the unrecoverable error may occur before the two PHBs are synchronized at block 710. In this case, the master PHB experiences the unrecoverable error, the hypervisor assigns the servant PHB to that master PHB, synchronizes the PHBs, and initiates the error recovery process on the master PHB.

Alternatively, the master PHB may begin the recovery process after the two PHBs are synchronized regardless of whether the master PHB has experienced an unrecoverable error. Initiating the error recover process before experiencing an unrecoverable error may reduce the likelihood that data is lost or dropped when the master PHB encounters an unrecoverable error. In this case, the master PHB may immediately perform the error recovery process once the two PHBs are synchronized.

The error recovery process may include transmitting a signal to the servant PHB to inform it that the master PHB is initiating the recovery process and that the servant PHB is now designated as the master. If the host computing device has not done so already, the hypervisor may activate the selection logic to couple the servant PHB (now the designated master PHB) to the PCI communication path between the master PHB and its PCI switch. The PCI switch may be updated so that data traffic from the I/O devices routes through the servant PHB which, because of the synchronization process, contains the necessary routing information to forward data from the I/O devices to computing elements within the host device and to forward data from the computing elements to the I/O devices. Thus, while the master PHB is being reset, the servant PHB maintains the communication between the I/O devices and the host computing device. A more detailed description of the handoff between the master and servant PHB is found in FIG. 4 above.

After the master PHB has completed the error recovery process, in one embodiment, the primary responsibility for communicating with the PCI switch may be returned to the recovered master PHB. As such, the servant PHB that was designated temporarily as master may again be returned to a standby state. Before doing so, the hypervisor may resynchronize the two PHBs in case the routing information changed while the master PHB was performing the error recovery process. The servant PHB may then handoff the task of communicating with the PCI switch back to the master PHB. Doing so frees the servant PHB to be assigned as a backup to a different master PHB.

In one embodiment, each of the PHBs may be capable of serving as a master PHB or a servant PHB for any of the other PHBs in the host computing device. That is, the host computing device may contain selection logic that permits any of the PHBs to connect to any of the PCI switches. In this example, once the master PHB recovers, the hypervisor may designate it as a servant which then can be assigned to any of the other master PHBs in the device. That is, the PHB that completed the error recovery process may not immediately be returned to its previous role as a master PHB but instead can be used by the host computing device as the servant PHB to backup the master PHBs currently communicating with a PCI switch. Regardless of whether the recovered PHB is used as the servant PHB or returned to its previous assignment as a master PHB, method 700 may repeat so the host computing device can identify other master PHBs that may need to perform the error recovery process.

Figure 8:
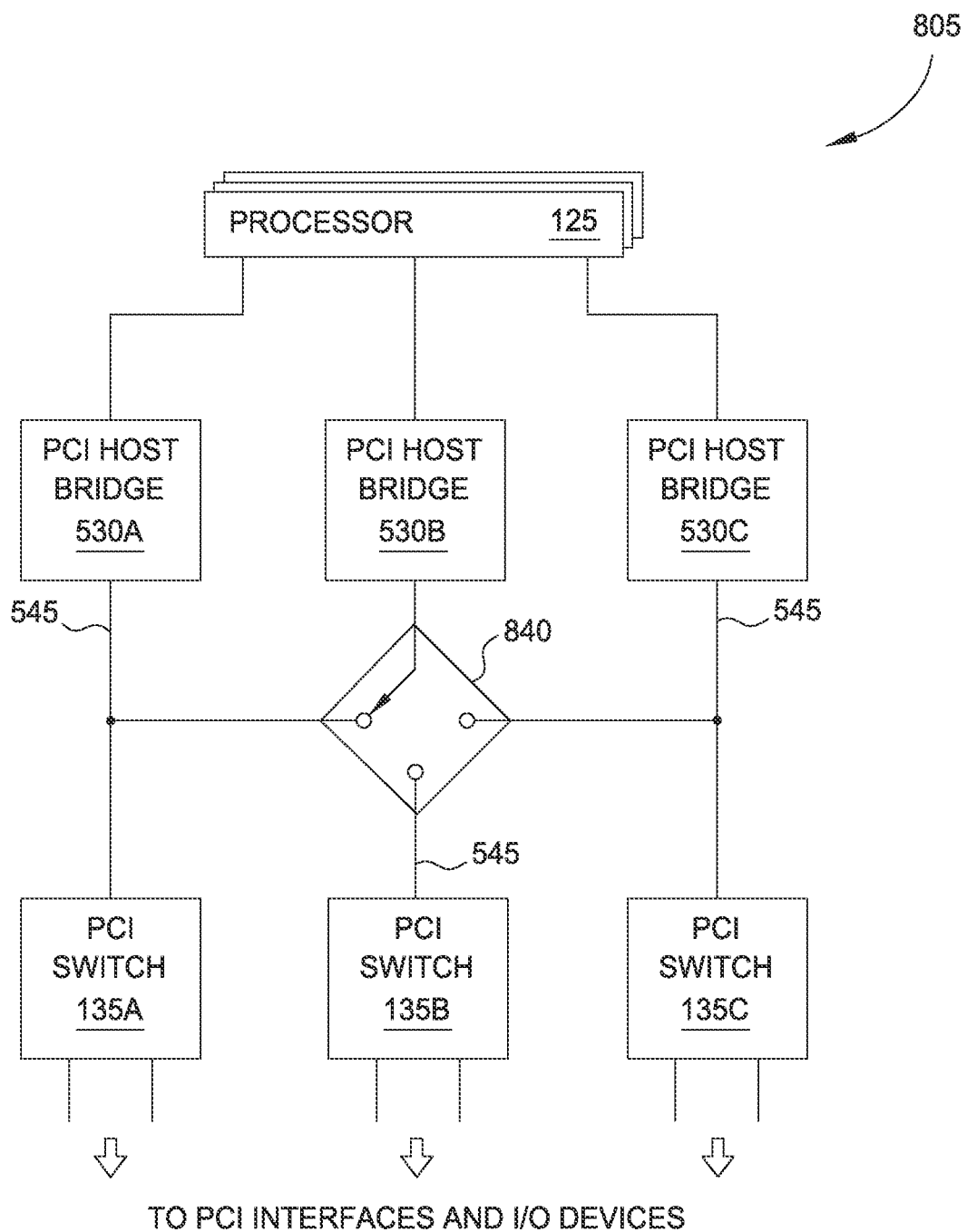
FIG. 8 illustrates a system diagram of a computing device with a PHB that can be a servant PHB or a standalone PHB, according to one embodiment described herein.

FIG. 8 illustrates a system diagram of a computing device with a PHB that can be a servant PHB or a standalone PHB, according to one embodiment described herein. Host computing device 805 in FIG. 8 differs from the host computing device 505 in FIG. 6 in that the selection logic 840 is configured such that the servant PHB may be coupled to a respective PCI switch 135B or to a PCI switch corresponding to a master PHB—e.g., PCI switches 135A or 135C. Thus, the host computing device 805 includes a PCI switch 135 for every PHB 530 (a one-to-one relationship) while host computing device 505 in FIG. 5 contains one fewer PCI switch 135 than PHB 530.

The selection logic 840 may enable PHB 530B to be switched between a standalone state and a standby state. For example, the PHB 530B may be switched from the standalone state where the PHB is coupled to its own respective PCI switch 135B or a servant/standby state where the PHB is assigned (or will be assigned in the future) to one of the master PHBs 530A or 530C. In one embodiment, a register in the PHB 530B may include a flag that indicates whether it is to operate as a standalone PHB or a servant PHB. Based on the flag, the hypervisor may control the selection logic 840 to couple the PHB 530B to the appropriate PCI switch 135. Furthermore, the state of the PHB 530B may change dynamically. At start up, the PHB 530B may be designated as a servant PHB, but due to a configuration change (e.g., additional I/O devices are added), the PHB 530B may be switched to a standalone PHB and communicatively coupled to PCI switch 135B in order to provide additional bandwidth.

Figure 9:
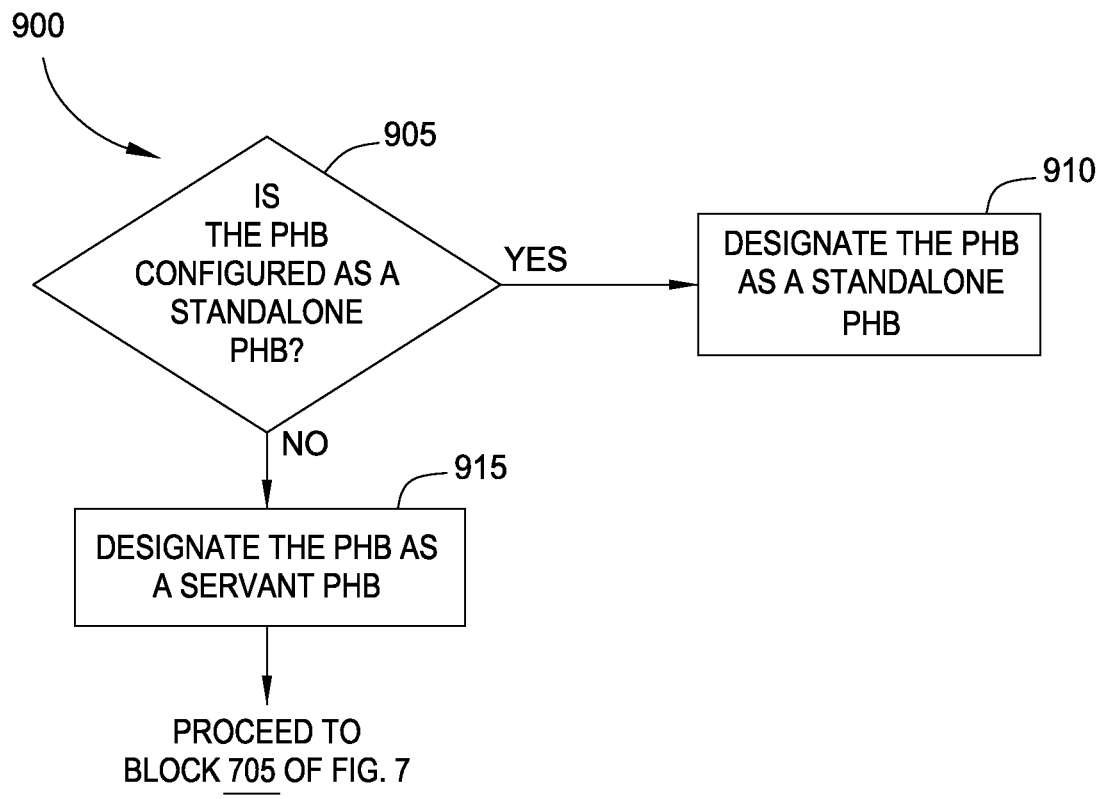
FIG. 9 is a flow chart for configuring a PHB as a servant PHB or a standalone PHB, according to one embodiment described herein.

FIG. 9 is a flow chart for configuring a PHB as a servant PHB or a standalone PHB, according to one embodiment described herein. Method 900 illustrates one example of operating a PHB that may be configured either as a standalone PHB or a servant PHB. At block 905, the hypervisor may check a flag associated with the PHB to determine what state the PHB is in. For example, if the flag has a non-null value, at block 910 the hypervisor may configure the PHB as a standalone PHB. In this state, the PHB may be connected to its own PCI switch. The standalone PHB may also be a master PHB where another PHB in the host device backs up the PHB. Thus, if the standalone/master PHB fails or experiences an unrecoverable error, the servant PHB may take over the responsibility for communicating to the PCI switch while the PHB performs the error recovery process.

If the flag is null, at block 915, the PHB is designated as a servant PHB. As such, the host computing device would not connect the PHB to its own PCI switch but rather use the technique disclosed in method 700 of FIG. 7 to identify a master PHB to assign to the servant PHB (assuming one has not been assigned already). In one embodiment, the PHB may be assigned to a state during a startup of the host computing device which may not change during operation. That is, once the PHB is flagged as either a standalone or servant PHB, it remains in that state until the host computing device is restarted. Alternatively, the PHB may change from one state to another during operation of the host computing device. For example, at start up the host computing device may designate the PHB as a standalone PHB and couple the PHB to its own PCI switch. However, if the I/O devices coupled to that switch are removed or no longer send data to the host computing device, the hypervisor may change the PHB from a standalone PHB to a servant PHB in order to improve the availability of the host computing device. Thus, in this example, a PHB may be assigned to one state during startup but then dynamically change to a different state during operation.

CONCLUSION

A servant PHB may serve as a backup or standby PHB for multiple master PHBs. For example, the host computing device may include selection logic that couples the servant PHB to the PCI communication path associated with any one of the master PHBs. At startup, the servant PHB may either be assigned to backup a particular master PHB or the host computing device may wait to assign the servant PHB at a later time during operation. For example, the host computing device may monitor the master PHBs to determine if the errors they generate exceed a threshold. Once one of the master PHBs satisfies the threshold, the servant PHB may be assigned to backup that PHB. The host computing device may then synchronize the servant PHB with the master PHB. Upon synchronizing the PHBs, the host computing device may reset the master PHB and designate the servant PHB as the master. Alternatively, the host computing device may wait to initiate the error recovery process until the master PHB encounters an unrecoverable error.

In one embodiment, a PHB may also be selectively configurable as either a standalone PHB or a servant PHB. Based on register settings, the host computing device may designate the PHB as a standalone PHB and couple the PHB to its own PCI switch. Alternatively, the host computing device may designate the PHB as a servant PHB and selectively couple the PHB to one of the PCI communication paths associated with the master PHBs as discussed above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing system, comprising:
    a plurality of master peripheral component interconnect (PCI) host bridges, each master PCI host bridge (PHB) is coupled to a respective PCI switch via a respective PCI communication path for facilitating PCI communication between the computing system and I/O devices;
    a servant PHB selectively coupled to each of the PCI communication paths via selection logic; and
    supervisory logic configured to:
        upon determining that one of the plurality of master PHBs satisfies an error threshold, assign the servant PHB to backup the one master PHB;
        upon assigning the servant PHB to backup the one master PHB, synchronize the servant PHB with the one master PHB;
        couple, using the selection logic, the servant PHB to the respective PCI communication path of the one master PHB; and
        reset the one master PHB, wherein PCI communication between the computing system and at least one of the I/O devices flows through the servant PHB while the one master PHB is reset.

2. The computing system of claim 1, wherein the supervisory logic is further configured to:
    count the number of correctable errors experienced by each of the plurality of master PHBs, the correctable errors do not prevent the master PHBs from facilitating PCI communication between the computing system and the I/O devices; and
    compare the number of correctable errors to the error threshold, the error threshold comprises a predefined number of correctable error or a predefined error frequency.

3. The computing system of claim 2, wherein the one master PHB is reset before detecting an unrecoverable error at the one master PHB, the unrecoverable error preventing PCI communication between the computing system and the I/O device via the one master PHB.

4. The computing system of claim 2, wherein the one master PHB is reset after detecting an unrecoverable error at the one master PHB, the unrecoverable error preventing PCI communication between the computing system and the I/O device via the one master PHB.

5. The computing system of claim 1, wherein the supervisory logic is further configured to:
    detect an unrecoverable error at the one master PHB, the unrecoverable error preventing PCI communication between the computing system and the I/O device via the one master PHB.

6. The computing system of claim 1, further comprising a separate PCI switch that is selectively coupled to the servant PHB, the computing system comprises a one-to-one relationship between a number of PHBs and a number of PCI switches.

7. The computing system of claim 1, wherein the supervisory logic is configured to:
after synchronizing the servant PHB with the one master PHB but before resetting the one master PHB, detect an event on the one master PHB indicating that the functionality of the one master PHB is inhibited;
after detecting the event, change a state of the servant PHB from a servant state to a master state, wherein the servant PHB is configured to facilitate PCI communication between the computing system and the at least one I/O device; and
after changing the state of the servant PHB, reset the one master PHB.

8. A computing system comprising:
a plurality of master PHBs, each of the plurality of master PHBs is coupled to a respective PCI switch via a respective PCI communication path for facilitating PCI communication between the computing system and I/O devices;
selection logic with an first interface and a second interface, wherein the first interface comprises respective PCI links to each of the respective PCI communication paths;
a servant PHB coupled to the second interface of the selection logic, wherein the selection logic is configured to communicatively couple the servant PHB to a first one of the respective PCI communication paths during a first time period and communicatively couple the servant PHB to a second one of the respective PCI communication paths during a second time period, wherein the servant PBH backs up a first one of the plurality of master PHBs during the first time period and backs up a second, different one of the plurality of master PHBs during the second time period.

9. The computing system of claim 8, wherein a total number of PHBs in the computing system is greater than a total number of PCI switches in the computing system such that the servant PHB is a redundant PHB.

10. The computing system of claim 8, wherein a total number of PHBs in the computing system is equal to a total number of PCI switches in the computing system such that the servant PHB is selectively configurable into one of: (i) a standby state where the servant PHB is a backup for the master PHBs and (ii) a standalone state where the servant PHB is not a backup for any of the master PHBs and is coupled, via the selection logic, to a separate PCI switch.

11. The computing system of claim 8, wherein the selection logic includes data routes that selectively couple the servant PHB to each of the plurality of master PHBs.

12. The computing system of claim 8, wherein the first and second time periods are separated by a third time period where the first master PHB is performing a reset and the servant PHB assumes the communication function that was previously performed by the first master PHB.

13. The computing system of claim 8, where during the first time period the servant PHB is synchronized to the first master PHB and during the second time period the servant PHB is synchronized to the second master PHB.

\* \* \* \* \*